United States Patent [19]
Brännström

[11] Patent Number: 5,503,661
[45] Date of Patent: Apr. 2, 1996

[54] METHOD AND DEVICE IN A FILTER VALVE

[75] Inventor: Roine Brännström, Finspong, Sweden

[73] Assignee: ABB Carbon AB, Finspong, Sweden

[21] Appl. No.: 240,747

[22] PCT Filed: Oct. 22, 1992

[86] PCT No.: PCT/SE92/00735

§ 371 Date: May 10, 1994

§ 102(e) Date: May 10, 1994

[87] PCT Pub. No.: WO93/09864

PCT Pub. Date: May 27, 1993

[30] Foreign Application Priority Data

Nov. 12, 1991 [SE] Sweden ................................ 9103321

[51] Int. Cl.$^6$ .......................... B01D 46/24; B01D 35/147
[52] U.S. Cl. .............................. 95/273; 95/291; 55/212;
55/341.1; 55/367; 55/369; 55/425; 55/523
[58] Field of Search .................................. 95/1, 273, 291;
55/210, 212, 213, 341.1, 367, 369, 418,
424, 425, 523; 210/323.2, 510.1

[56] References Cited

U.S. PATENT DOCUMENTS

| 2,790,578 | 4/1957 | Moeller et al. | 55/418 X |
| 2,892,510 | 6/1959 | Wygant | 55/212 X |
| 2,892,512 | 6/1959 | Watts et al. | 55/213 |
| 3,537,240 | 11/1970 | Weidinger et al. | 55/418 X |
| 3,712,114 | 1/1973 | Osborn | 55/367 X |
| 3,865,561 | 2/1975 | Osborn | 55/341.1 X |
| 4,297,113 | 10/1981 | Theodore | 55/213 |
| 4,356,007 | 10/1982 | Bowman | 55/213 |
| 4,999,032 | 3/1991 | Wright | 55/213 X |

FOREIGN PATENT DOCUMENTS 0543731  3/1994  United Kingdom ................ 55/367

Primary Examiner—Robert Spitzer
Attorney, Agent, or Firm—Pollock, Vande Sande & Priddy

[57] ABSTRACT

A method and a device are provided for cutting off a gas flow through a filter element in a ceramic filter of high-temperature type upon breakage of the filter element, wherein a pulling member which is fixed to the lowermost part of the filter element causes a valve to be closed upon breakage of the filter element, whereby the outlet of the filter element for normally cleaned gases is closed.

7 Claims, 2 Drawing Sheets

METHOD AND DEVICE IN A FILTER VALVE

TECHNICAL FIELD

The present invention relates to a method and a device for cutting off a gas flow through a filter element in a ceramic filter of high-temperature type in connection with breakage of the filter element.

BACKGROUND OF THE INVENTION

When filtering hot gases at high temperatures, for example when cleaning flue gases in combustion plants, filter elements of a ceramic type of many different embodiments are used today. In one embodiment filters may be composed of a large number of filter elements in a large filter container. This container is provided at its upper part with an outlet for cleaned gases and at its lower part with a collection space for dust separated in the filter and fallen down from the filter elements. Uncleaned gas enters the space below the filter elements at the side of the container. The filter elements may be suspended from a plate, provided with holes, in the upper part of the container where the plate supports the individual filter elements. Each hole in the plate is equipped with a filter element suspended below the hole, which filter element cleans the gases which flow through the filter element and further out through that hole in the plate which is associated with the respective filter element, the gas above the plate thus becoming free from dust and being brought to the outlet of the filter container. Dust from the uncleaned gas will adhere to the outside of the different filter elements. This dust will loosen when a gas is brought to pass through the filter elements in reverse direction during periodically recurring cleanings of the filter compound. The dust from the collection space is fed out at the lower part of the container.

Ceramic materials included in filters of the kind described above have a stochastic composition from the point of view of strength, which is caused by the fact that in each produced ceramic component imperfections exist in the internal structure of the ceramic. This may lead to breakage of the component if it is subjected to stress, for example in the form of temperature transients.

In a filter with many filter elements there is always a risk that one or more filter elements will break, usually in such a way that part of the filter element walls down from its position. The consequence of this breakage of the filter element is that a certain part of the gas, that part which passes through the broken filter element, is admitted through this element in uncleaned state, which is totally unacceptable since a sub-quantity of completely uncleaned gas will flow out of the filter elements.

The filter elements in the above-described type of filters are suspension-mounted and are relatively heavy. When such a filter element is broken, a breakage of the whole filter element occurs, whereby the lower part or parts of the broken filter element fall(s) down.

SUMMARY OF THE INVENTION

The present invention is a method and a device for cutting off a gas flow through a filter element in a ceramic filter of high-temperature type upon breakage of the filter element, in which a pulling member which is attached to the lowermost part of the filter element brings a valve to close upon breakage of the filter element. In particular, the outlet of the filter element for normally cleaned gases is closed in that the lower, detached part of the filter element, which falls down upon breakage of the filter element, during the falling down stretches the pulling member such that this member causes the cut-off mechanism of the valve to close the valve at the outlet of the filter element.

The pulling member for closing the valve, includes, for example, of a wire, a link mechanism, a chain, or the like. One end of this pulling member is fixed to the lowermost part of the ceramic filter element, whereas the other end of the pulling member is connected to a cut-off mechanism on the valve. The cut-off mechanism of the valve may be formed in many different ways. As an example may be mentioned a variant in which the pulling member is connected to one end of a short lever, which is fixed to the valve. When stretching the pulling member, the lever will cause the valve to close. The principle of the automatic closing of a valve in case of breakage of the filter element associated with the valve is based on the fact that the lowermost part of the filter element, which falls down upon breakage of the filter element and to which the lower end of the pulling member is attached, because of the inherent potential energy of this lower part, when falling down creates a jerk in the pulling member such that the pulling member is stretched. In the fall, sufficient kinetic energy is imparted to the falling-down pare of the filter element to perform such a stretching operation, since the falling filter element part has a certain weigh which, taken together with the fact that it falls a certain distance which may amount to several meters before the pulling member is stretched, contributes to produce sufficient kinetic energy. It is also possible to provide that part of the filter element, where the pulling member is connected to the element, with an extra weight to ensure that the falling, detached part of a filter element, in case of breakage thereof, has a sufficiently large weight if the detached part as such only constitutes a minor part of the actual filter element.

The valve or the valve member may includes a varying number of types of known valves in the form of flap valves, throttle valves, ball valves or the like, and is of no critical importance to the invention.

In other embodiments, the pulling member only triggers a release mechanism for closing the valve member. The valve member is then connected to a source with stored energy, whereby, when releasing this stored energy by means of the pulling member, the stored energy affects the valve member with a force which causes the valve member to close. Also valve servos of these exemplified types constitute examples of the prior art and will not be described further here. The stored energy is found, for example, in a pressurized pneumatic or hydraulic container, a tensioned spring, a suspended weight, or a chemical charge where the stored energy effects closing of the valve member by releasing the pulling member.

DETAILED DESCRIPTION OF THE PREFERRED EMBODIMENTS

Figure 1:
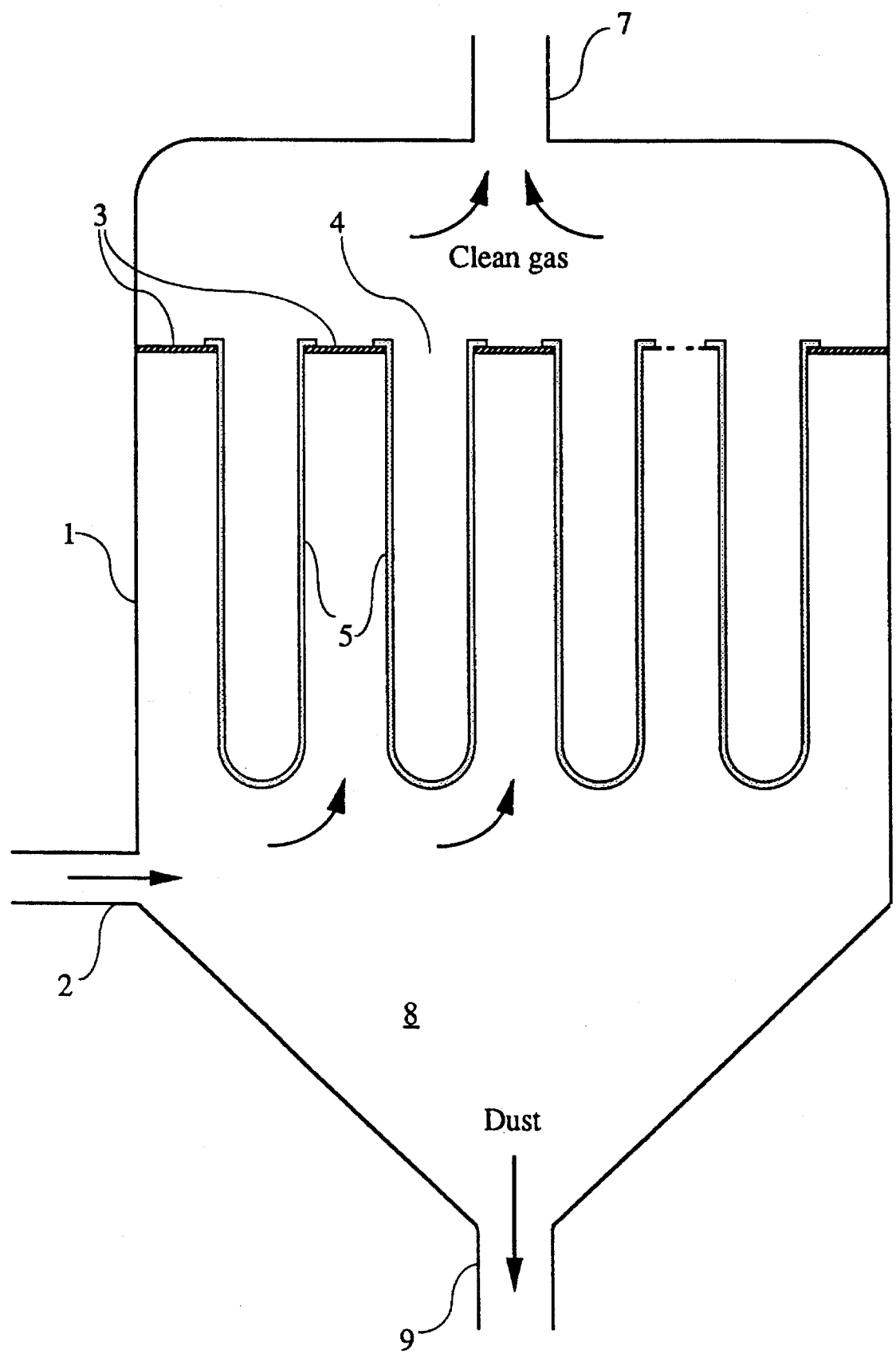
FIG. 1 illustrates a known filter unit and shows the location and mounting of the filter elements in the filter unit.

With reference to the accompanying figures, a few embodiments of the present invention will be described. FIG. 1 shows a complete filter unit which is used, for example, for cleaning of hot and dust-laden combustion gases from a power plant. The insulation necessary for the filter unit is not shown in the figure. Such a filter unit constitutes prior art. The filter unit is intended to clean the gas and to thereby separate dust and cleaned gas from each other, and the dust and cleaned gas are discharged from the filter unit via different outlets.

The filter unit comprises a filter container 1 with an inlet 2 for dust-laden gas at the side of the container 1. In the upper part of the filter container 1, a plate 3 extends across the entire filter container 1 such that the container is divided into two spaces separated from each other. The plate 3 is provided with a number of openings 4, which allow gas from the space below the plate to flow to the space above the plate 3. In the openings 4 of the plate 3 filter elements 5 are suspended in such a way that gas flowing out through the openings 4 is forced first to flow through the filter elements 5, which may consist of tubes or sacks of a preferably ceramic material which are closed at the bottom. When uncleaned gas from the space below the plate 3 flows through the filter material in a filter element 5, dust will adhere on the outside of the filter element 5, whereas gas freed from dust passes through the opening 4 and is passed on as cleaned gas out through a gas outlet 7 in the upper part of the filter container 1. Dust adhering to the outside of the filter element 5 falls down into a dust compartment 8 which is equipped with a dust outlet 9 through which dust may be removed where necessary.

Figure 2A:
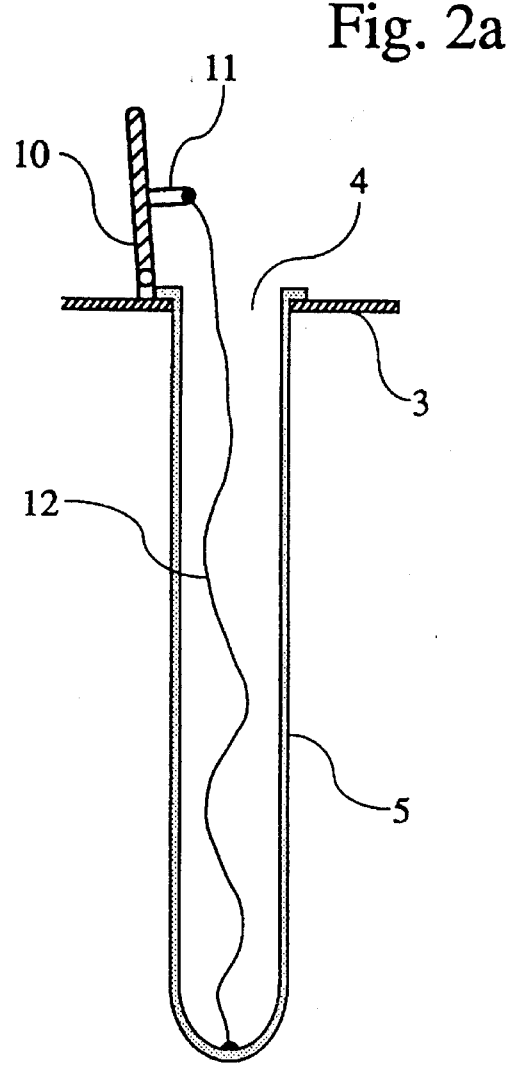
FIG. 2a shows a filter element with an associated valve member according to the present invention.
Figure 2B:
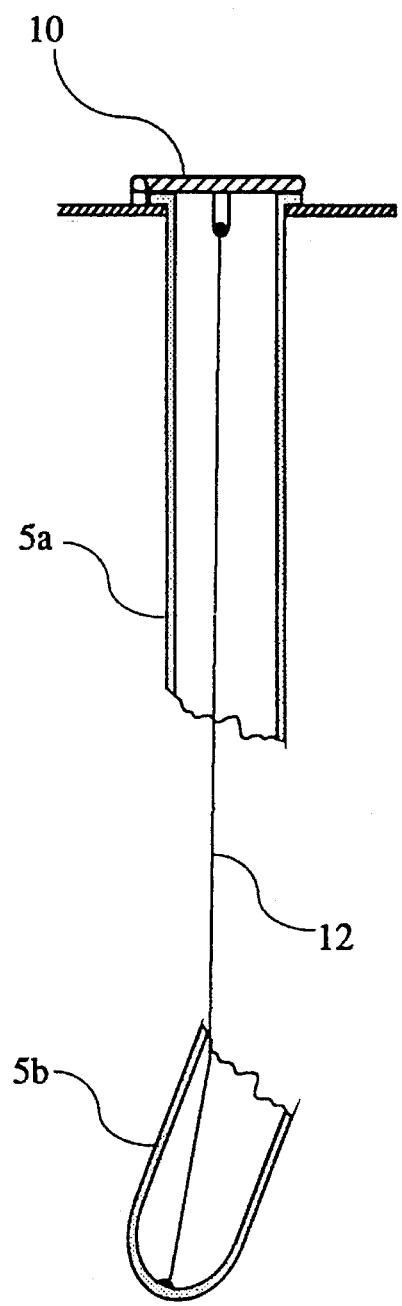
FIG. 2b shows a broken filter element, where a fallen down part of the filter element has stretched a pulling member which has closed a valve member belonging to the element.

The method according to the present invention will be described with reference to FIGS. 2a and 2b. FIG. 2a shows a filter element 5 hanging under an opening 4. At the side of the opening 4, a valve member 10 is mounted. In this example the valve member 10 is equipped with a small lever 11. To this lever 11 the pulling member 12 of the filter element is secured. The other end of the pulling member 12, which in the example shown is in the form of a wire, is connected to the lowermost part of the filter element 5. FIG. 2b illustrates what happens when a filter element 5 breaks. Because of a breakage of the filter element 5, the element is divided into two parts, namely, an upper, remaining part 5a and a lower, fallen down part 5b. The part 5b fallen down upon breakage of the filter element 5 stretches the pulling member 12 when falling down, whereby the pulling member 12, while being influenced by the lever 11 in this example, causes the valve member 10 to close the opening 4. In this way, uncleaned flue gases are prevented from flowing through the remaining part 5a of the filter element 5, which is now open for uncleaned gases, which would enable free passage of uncleaned gases through the opening 4 unless this opening 4 was closed. Because of the weight of the fallen down part 5b, this part will continue to keep the pulling member 12 stretched, whereby the valve member 10 is kept continuously closed.

In another embodiment the pulling member 12 releases a release mechanism, which controls a cut-off device at the valve member 10 by means of a force received from stored energy. The stored energy is supplied to the valve member 10 by means of a pneumatic or hydraulic pressure medium from a pressurized container, in which the pulling member 12 controls the supply (if any) of pressure medium for closing the valve member 10.

In still other embodiments, the pulling member 12 controls the release of the inherent energy in a tensioned spring which closes the valve member 10 upon release, or the inherent energy of a suspended weight which is brought to fall when the pulling member 12 triggers a mechanism which releases the weight such that the energy of the falling weight becomes sufficient to produce a force adapted to close the valve member 10.

In the valve member 10, in an alternative embodiment, the stored energy for closing the valve member 10 may consist of a chemical charge which is released by the pulling member 12, thus closing the valve member 10.

By self-closing valve devices of the above-described kind in each individual filter element 5 in a filter unit comprising a large number of filter elements 5, it is possible to accept a certain number of broken filter elements without damaging the function of the filter unit. In principle, the broken filter elements 5 need to be replaced only when the total gas flow through the openings 4 in the filter unit becomes too small because too many valve members 10 are closed.

I claim:

1. A method for cutting off a gas flow through a filter element in a ceramic filter upon breakage of the filter element, wherein the filter includes a filter container, a plate with at least one opening, the plate being provided across the filter container to divide the filter container into an upper and a lower space, and at least one filter element suspended below the at least one opening in the plate, the method comprising the steps of:
   a) fixing a pulling member between a lowermost part of the filter element and a valve member positioned adjacent the opening,
   b) stretching said pulling member by falling down of the lowermost part detached from the filter element upon a breakage of the filter element, and
   c) closing the opening by said valve member actuated by said pulling member when stretched, thereby stopping the gas flow through the filter element.

2. A method according to claim 1, wherein upon said breakage of the filter element, the pulling member triggers a mechanism which is adapted to release stored energy, whereby the valve member is influenced by a force to close the opening of the filter element, the stored energy being obtained from one of a pressurized pneumatic or hydraulic container, a tensioned spring, a suspended weight, and a chemical charge.

3. A device for cutting off a gas flow through a filter element in a ceramic filter upon breakage of the filter element, wherein the filter includes: a filter container, a plate provided with at least one opening and being positioned across the filter container to divide the filter container into an upper and a lower space, and at least one filter element suspended below the at least one opening in the plate,
   the device including a pulling member which is secured to a lowermost part of the filter element and to a valve member which is positioned adjacent to the at least one opening whereby, upon stretching the pulling member by the falling of the lowermost part detached from the filter element upon its breakage, the opening is closed by the valve member.

4. A device according to claim 3, wherein the pulling member comprises one of a wire, a link mechanism, or a chain.

5. A device according to claim 3, wherein the valve member includes one of a flap valve, a throttle valve, or a ball valve.

6. A device according to claim 3, wherein the lowermost part of the filter element at a fixing point of the pulling member is provided with an extra weight in the form of a metal or a ceramic for the purpose of increasing the kinetic energy of the lowermost part falling down upon breakage of the filter element.

7. A device according to claim 3, wherein the valve member is adapted to be closed with a force produced by means of stored energy which is released by a cut-off mechanism controlled by the pulling member, wherein the stored energy is obtained from a pressurized pneumatic or hydraulic container, or a tensioned spring, or a suspended weight, or a chemical charge.

* * * * *